No. 779,330. PATENTED JAN. 3, 1905.
F. S. THORNLEY.
BALL CASTER.
APPLICATION FILED NOV. 17, 1903.

Witnesses:
Inventor: Frederic S. Thornley,
By Thomas G. Orwig, Attorney.

No. 779,330.

Patented January 3, 1905.

UNITED STATES PATENT OFFICE.

FREDERIC S. THORNLEY, OF PIERRE, SOUTH DAKOTA.

BALL-CASTER.

SPECIFICATION forming part of Letters Patent No. 779,330, dated January 3, 1905.

Application filed November 17, 1903. Serial No. 181,568.

*To all whom it may concern:*

Be it known that I, FREDERIC S. THORNLEY, a citizen of the United States, residing at Pierre, in the county of Hughes and State of South Dakota, have invented a new and useful Ball-Bearing Ball-Caster, of which the following is a specification.

My object is to provide an improved ball-caster and to facilitate the placing and retaining a plurality of small balls and a large ball in a semispherical cavity.

My invention consists in the construction and combination of elements, as hereinafter set forth, pointed out in my claim, and illustrated in the accompanying drawings, in which—

Figure 1:
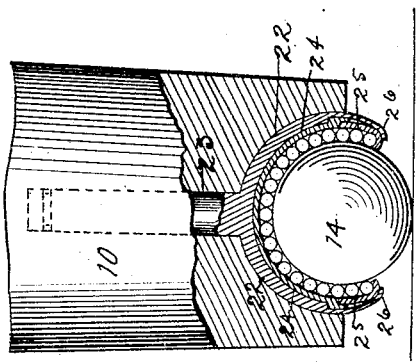
Figure 2:
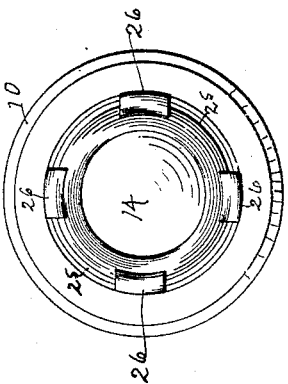

Figure 1 shows the semispherical cavity in a wooden leg and a metal lining or inner metal wall fitted in the cavity in the wood and provided with an integral shank extended into a central vertical bore in the wood and also provided with integral downward extensions that are adapted to be bent inward to retain an auxiliary metal lining and a cover for a plurality of small balls in place below the center of the large ball. Fig. 2 is a bottom view of Fig. 1.

The numeral 10 designates the wooden leg of a piano or article of furniture to which my caster is applied as required for practical use. It is obvious it must vary in size to support movable articles of varying size and weight. A metal lining 22 is fitted in the semispherical cavity in the wood and provided with integral extensions 26, adapted to serve as clasps for retaining an auxiliary metal lining, a plurality of small balls and a cover for the balls, and a large ball in proper positions relative to each other. It also has an integral shank 23 fitted in a vertical bore in the wood, as shown in Fig. 1 and as required for detachably connecting it with a wooden leg, without the use of any extraneous fastening device. An auxiliary lining 24 is fitted in the lining 22, and when the lining 22 is in an inverted position a plurality of small balls are placed in the auxiliary lining and will be retained there by force of gravity and a large ball 14 then placed on the small balls. The upper half of the large ball will thus be placed in contact with the small balls 24, and to retain them in proper position relative to each other as required for practical use and to retain small balls in contact with the large ball below its center I provide a cover 25, or practically an extension of the auxiliary lining 24, and place it on the edge thereof and then place additional small balls between the cover and the large ball and bend or swage the edge of the cover inward, as shown in Fig. 1, and to fasten the cover as required to retain the large ball and the small balls in place as required to handle the complete caster and apply it to a wooden leg for practical use I bend the integral extensions 26 of the metal lining 22 inward to overlie and clasp the cover 25, as shown in Fig. 2.

Having thus set forth the purpose of my invention and the specific manner of constructing and combining all the parts, the advantages thereof in manufacturing and the practical operation and utility of my ball-bearing caster adapted to be detachably connected with a wooden leg of an article of furniture, pianos, &c., is obvious.

What I claim as new, and desire to secure by Letters Patent, is—

A ball-caster consisting of a metal wall or lining for a semispherical cavity in the wooden leg of an article of furniture provided with an integral shank adapted to enter a bore in the wood and integral extensions adapted to be bent to overlie a cover, an auxiliary lining, a plurality of small balls, a large ball and a cover fitted to the edge of the main metal lining and bent inward at its lower edge, arranged and combined as shown and described for the purposes stated.

FREDERIC S. THORNLEY.

Witnesses:
E. K. EAKIN,
LYLE BRANCH.